April 11, 1967     C. C. FUERST     3,313,058
FISHING LURE
Filed Nov. 18, 1964
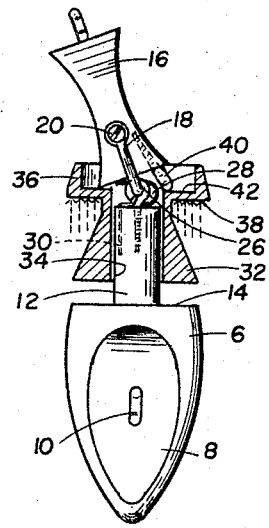
FIG·3
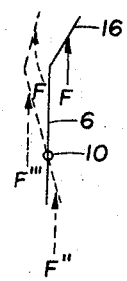
FIG·4
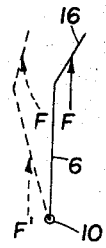
FIG·5
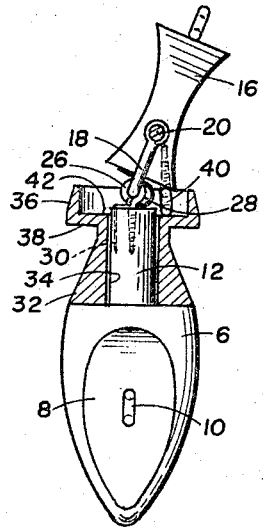
FIG·1
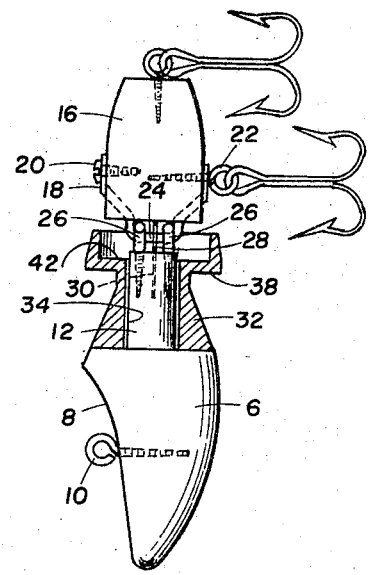
FIG·2
CARL C· FUERST
INVENTOR.
BY *(signature)*
ATTORNEY

United States Patent Office 3,313,058
Patented Apr. 11, 1967

---

3,313,058
FISHING LURE
Carl C. Fuerst, 29 Avalon Drive,
Rochester, N.Y. 14618
Filed Nov. 18, 1964, Ser. No. 412,011
7 Claims. (Cl. 43—42.02)

This invention relates generally to fishing tackle, and more specifically to a fishing lure of the type that imitates a small fish by performing a zigzag movement when being pulled through the water.

Fishing lures of the type that perform a zigzag movement when pulled through the water to imitate the movement of a real fish are well known in the art. Many of such fishing lures are of rather complicated construction requiring a great number of parts, thereby greatly increasing the probability of something going wrong during the operation of the lure. Also, many of such prior known lures are undependable. Applicant's invention is directed to an improved fishing lure of the type described that obviates these and other disadvantages of prior known lures.

It is therefore one object of the present invention to provide an improved fishing lure that is of simple design and construction, thoroughly reliable and efficient in operation, and economical to manufacture.

Another object of this invention is to provide an improved fishing lure having a tail that is movable in one direction from a normal position in response to water pressure when the lure is pulled, and is returned to its normal position by a resilient means when the pull on the lure is released.

A more specific object of the invention is to provide an improved fishing lure having a body, a waggable tail biased by a spring to a normal position, and an actuating element interposed between the body and tail and responsive to the pressure of the water when the lure is pulled through the water to move the tail from its normal position.

Objects and advantages other than those set forth above would be apparent when read in connection with the accompanying drawing, in which:

FIG. 1 is a top plan view partially in section of a preferred embodiment of applicant's improved fishing lure shown in its normal position;

FIG. 2 is a side elevation view of the fishing lure of FIG. 1 with hooks added thereto;

FIG. 3 is a top-plan view of the fishing lure of FIG. 1 shown in an operative position, which is the position assumed by the lure when it is suddenly pulled through the water;

FIG. 4 is a diagrammatic view of a lure showing the force acting thereon when a fishing line is secured to the end thereof; and FIG. 5 is a view similar to FIG. 4 showing the forces acting on the lure when a line is secured to the lure at a point intermediate the ends of the body of the lure.

As shown in the drawing, a preferred embodiment of applicant's fishing lure comprises a streamlined body 6 constructed of any suitable material. The body 6 has a cut-out portion 8, and an eye screw 10 threaded into body 6 at the cut-out portion 8 to which a fishing line, not shown, may be secured. One end of the body 6 further has a cylindrical projection 12 axially extending from an annular land 14 on body 6.

A substantially rectangular tail piece 16 having convex sides has a U-shaped bracket 18 secured to one end thereof by screws 20, 22, and a portion 24 of bracket 18 extends through a pair of spaced eye screws 26 in the end of the cylindrical projection 12 to pivotally secure the tail piece 16 to the projection 12. A wire spring 28, as best seen in FIG. 1, has one end extending in an opening 30 in the end of cylindrical projection 12, its intermediate portion extending between portion 24 and the end of projection 12, and its other end turned around portion 24 and bearing against an end surface of tail piece 16. The action of spring 28 biases tail piece 16 in a clockwise direction about eye screws 26 as seen in FIG. 1.

An actuating element 32 having a bore 34 therethrough for receiving the cylindrical projection 12 is interposed between land 14 of body 6 and tail piece 16. When one end of actuating element 32 is in engagement with land 14, the outer surface of element 32 conforms to the outer surface of body 6 as seen in FIG. 1 to provide a smooth-surfaced lure having the appearance of a fish's body. The opposite end of actuating element 32 has a cup-shaped flange 36, the annular exterior surface 38 of which is responsive to water pressure when the lure is suddenly pulled through the water. The end of an eye screw 40 threaded into tail piece 16 cooperates with the opposite surface 42 of flange 36 to provide a stop for tail piece 16 when moved into its normal position by spring 28.

In the operation of this invention, the fishing lure assumes its normal position as shown in FIG. 1 in which spring 28 urges tail piece 16 in a clockwise direction causing eye screw 40 to engage surface 42 of actuating element 32 and urge its opposite end into engagement with land 14. Now, if the fisherman should suddenly pull on the line, the water pressure exerted against surface 38 of actuating element 32 slidably moves the element on cylindrical projection 12 causing tail piece 16 to be moved in a counterclockwise direction against the bias of spring 28 by virtue of the eye piece 40 and surface 42 connection. This results in movement of the lure to its operative position as seen in FIG. 3. When the fisherman momentarily lets up on the line, spring 28 overcomes the water pressure urged against surface 38 and returns the lure to its normal position as seen in FIG. 1.

It is noted that the best zig-zag movement of the lure is achieved when the eye screw 10 is positioned intermediate the ends of body 6. It appears that in this position as seen diagrammatically in FIG. 4, the water not only imparts a force F against one of the sides of the tailpiece 16 when the lure is suddenly pulled, but also imparts a force F'' against a portion of the side of the body. Both of these forces act together to turn the lure against the opposition of force F''' acting on the remainder of the side of body 6. Where the line is secured to the end of body 6 as seen in FIG. 5, the force acting to turn the lure is opposed by a force F' acting on the entire length of the side of body 6, which force F' would be equal to the sum of forces F'' and F''', assuming the lure is subjected to pulls of equal force in both figures.

The invention has been described in detail with particular reference to a preferred embodiment thereof, but it will be understood that variations and modifications can be effected within the spirit and scope of the invention described hereinabove and as defined in the appended claims.

I claim:
1. In a fishing lure, the combination comprising:
 (a) a body portion having attachment means to which a fishing line may be secured;
 (b) a tail portion pivotally secured to said body portion and movable between a normal first position for directing said lure in one direction, and a second position for directing said lure in a different direction;
 (c) resilient means interposed between said body and tail portions for urging said tail portion into its normal first position; and
 (d) an actuating element slidably mounted on said body portion and interposed between said body and tail portions with a first surface portion of said element in engagement with said tail portion, said element further having a second surface portion responsive to water pressure acting thereon when said lure is suddenly pulled by said fishing line for pivotally moving said tail portion to said second position against the bias of said resilient means.

2. The invention according to claim 1 wherein said attachment means is positioned intermediate the ends of said body portion.

3. The invention according to claim 1 wherein said actuating element is a flange having said second surface portion against which said water pressure acts.

4. The invention according to claim 3 wherein said flange is of an annular configuration.

5. The invention according to claim 1 wherein said body portion has an axially extending cylindrical projection, and said actuating element is slidably mounted on said projection.

6. The invention according to claim 5 wherein said actuating element is an annular flange having said second surface portion against which said water pressure acts.

7. The invention according to claim 6 wherein said body portion has a stop for said actuating element, and said first surface portion of said actuating element serves as a stop for said tail portion, and in said normal first position, said resilient means urges said actuating element into engagement with said body portion stop, and said tail portion into engagement with said first surface portion stop.

References Cited by the Examiner
UNITED STATES PATENTS

| 1,417,574 | 5/1922 | Schmid | 43—42.02 X |
| 1,441,059 | 1/1923 | Brown | 43—42.15 X |
| 2,556,533 | 6/1951 | Graaten | 43—42.15 |
| 2,791,859 | 5/1957 | Wentworth | 43—42.02 |

SAMUEL KOREN, *Primary Examiner.*

WARNER H. CAMP, *Examiner.*